(12) United States Patent
Ito et al.

(10) Patent No.: US 7,323,428 B2
(45) Date of Patent: *Jan. 29, 2008

(54) CERAMIC ELECTRONIC DEVICE AND PRODUCTION METHOD THEREOF

(75) Inventors: Kazushige Ito, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 11/247,180

(22) Filed: Oct. 12, 2005

(65) Prior Publication Data

US 2006/0088719 A1    Apr. 27, 2006

(30) Foreign Application Priority Data

Oct. 12, 2004   (JP)   .............................. 2004-297891

(51) Int. Cl.
*C04B 35/468*   (2006.01)
(52) U.S. Cl. ....................... 501/139; 501/138
(58) Field of Classification Search ................ 501/138, 501/139
See application file for complete search history.

(56) References Cited

U.S. PATENT DOCUMENTS

| | | | |
|---|---|---|---|
| 4,870,539 A | 9/1989 | Chance et al. | |
| 5,335,139 A | 8/1994 | Nomura et al. | |
| 5,550,092 A | 8/1996 | Chu et al. | |
| 5,668,694 A | 9/1997 | Sato et al. | |
| 2003/0039090 A1 | 2/2003 | Hiroyasu et al. | |
| 2004/0105214 A1 | 6/2004 | Tomoyuki et al. | |
| 2006/0046923 A1* | 3/2006 | Ito et al. ..................... | 501/139 |
| 2007/0142209 A1* | 6/2007 | Ito et al. ..................... | 501/137 |

FOREIGN PATENT DOCUMENTS

| | | |
|---|---|---|
| DE | 199 18 091 A1 | 10/2000 |
| EP | 0 378 989 A | 7/1990 |
| EP | 0 726 235 A | 8/1996 |
| EP | 0 739 019 A | 10/1996 |
| GB | 2 286 183 A | 8/1995 |
| JP | A 2000-311828 | 11/2000 |
| JP | A 2004-107200 | 4/2004 |
| JP | A 2004-155649 | 6/2004 |

* cited by examiner

*Primary Examiner*—Karl E Group
(74) *Attorney, Agent, or Firm*—Oliff & Berridge, PLC

(57) ABSTRACT

A highly reliable ceramic electronic device having an excellent temperature characteristic of a capacitance and a low IR temperature dependency, comprising a dielectric layer: wherein the dielectric layer includes a main component expressed by a composition formula of $Ba_m TiO_{2+m}$, wherein "m" satisfies $0.995 \leq m \leq 1.010$ and a ratio of Ba and Ti satisfies $0.995 \leq Ba/Ti \leq 1.010$, and, as subcomponents, an oxide of Al and an oxide of Si or an oxide of R (note that R is at least one kind selected from Sc, Y, La, Ce, Pr, Nd, Pm, Sm, Eu, Gd, Tb, Dy, Ho, Er, Tm, Yb and Lu); and includes a secondary phase composed of at least a part of the oxide of Al and at least a part of the oxide of Si or the oxide of R and being different from a main phase mainly composed of the main component; and the production method are provided.

15 Claims, 3 Drawing Sheets

CERAMIC ELECTRONIC DEVICE AND PRODUCTION METHOD THEREOF

BACKGROUND OF THE INVENTION

1. Field of the Invention

The present invention relates to a ceramic electronic device, such as a multilayer ceramic capacitor, and the production method, and particularly relates to a highly reliable ceramic electronic device having a temperature characteristic of a capacitance and low IR temperature dependency and the production method.

2. Description of the Related Art

A multilayer ceramic capacitor as an example of an electronic device is produced, for example, by co-firing a green chip obtained by alternately stacking ceramic green sheets formed by a predetermined dielectric ceramic composition and internal electrode layers having a predetermined pattern and making the result to be one body. The internal electrode layers of the multilayer ceramic capacitor are made to be one body with ceramic dielectrics by firing, so that it has been necessary to select a material which dose not react with the ceramic dielectrics. Therefore, it has been inevitable to use expensive precious metals, such as platinum and palladium, as the material for forming the internal electrode layers.

However, dielectric ceramic compositions, wherein inexpensive base metals, such as nickel and copper, can be used, have been developed in recent years and a large reduction of costs has been realized.

In recent years, multilayer ceramic capacitors have come to be used in a variety of electronic devices, such as an electronic control unit (ECU) installed in an engine room of a vehicle, a crank angle sensor and an Anti Lock Brake System (ABS) module. Since these electronic devices are for stable engine controlling, drive controlling and brake controlling, preferable temperature stability of the circuit is required.

Environments of using the electronic devices are expected to become about −20° C. or lower in winter in cold climates and about +130° C. or higher after the engine starts in summer. Recently, there is a tendency of reducing a wire harness for connecting the electronic device and a device to be controlled thereby and the electronic device may be provided outside of a vehicle, therefore, environments for the electronic devices have been getting more severe. Accordingly, there is a demand for an electronic device having an excellent temperature characteristic.

For the purpose of improving the temperature characteristic, for example, the patent article 1 (the Japanese Unexamined Patent Publication No. 2004-107200) discloses a dielectric ceramic composition comprising main crystal grains, interfacial grain boundary phases formed by the main crystal grains, and triple point grain boundary phases including $M_4R_6O(SiO_4)_6$ crystal ("M" is an alkaline metal and "R" is a rare earth).

Also, the patent article 2 (the Japanese Unexamined Patent Publication No. 2004-155649) discloses a dielectric ceramic comprising $ABO_3$ ("A" is Ba, etc. and "B" is Ti, etc.) as a main component and also a rare earth element and Si, wherein at least a part of said rare earth element and said Si exist as a composite compound being different from the main component, $ABO_3$.

However, in the patent articles 1 and 2, the temperature characteristic is compensated only up to 125° C. and, when used at a higher temperature (for example, 150° C.), there is a disadvantage that the capacitance is deteriorated. Moreover, there also have been disadvantages that dielectrics described in the articles have large IR temperature dependency, particularly, a decline of resistance (IR) when used at a high temperature is remarkable and the reliability is poor.

SUMMARY OF THE INVENTION

An object of the present invention is to provide a highly reliable ceramic electronic device having an excellent temperature characteristic of the capacitance and low IR temperature dependency, and the production method. Particularly, the object of the present invention is to provide a ceramic electronic device capable of effectively preventing a decline of the capacitance and IR (insulation resistance) even at a high temperature (for example, 150° C.) and being used at a high temperature, and the production method.

To attain the above object, according to the present invention, there is provided a ceramic electronic device comprising a dielectric layer, wherein:

the dielectric layer includes a main component expressed by a composition formula of $Ba_mTiO_{2+m}$, wherein "m" is $0.995 \leq m \leq 1.010$ and a ratio of Ba and Ti is $0.995 \leq Ba/Ti \leq 1.010$, and a subcomponent;

the subcomponent includes an oxide of Al, and an oxide of Si or an oxide of R (note that R is at least one kind selected from Sc, Y, La, Ce, Pr, Nd, Pm, Sm, Eu, Gd, Tb, Dy, Ho, Er, Tm, Yb and Lu); and at least a part of the oxide of Al and at least a part of the oxide of Si or the oxide of R form a secondary phase being different from a main phase mainly composed of the main component, and the secondary phase is included in the dielectric layer.

In the present invention, by forming a secondary phase (segregation phase) including the oxide of Al and the oxide of Si or a secondary phase (segregation phase) including the oxide of Al and the oxide of R in the dielectric layer, it is possible to obtain a ceramic electronic device having an excellent temperature characteristic of the capacitance and low IR temperature dependency. Particularly, according to the present invention, it is possible to obtain a ceramic electronic device capable of effectively preventing a decline of the capacitance and IR (insulation resistance) and being used at a high temperature.

Note that, in the present invention, the oxide of R included in the secondary phase is at least one kind of oxide selected from Sc, Y, La, Ce, Pr, Nd, Pm, Sm, Eu, Gd, Tb, Dy, Ho, Er, Tm, Yb and Lu, and a secondary phase including two or more kinds of oxides (for example, an oxide of Sc and an oxide of Y) may be also formed.

The secondary phase (segregation phase) in the present invention is a part where the oxide of Al, the oxide of Si and/or the oxide of R as composite oxides segregate and exist in high concentration comparing with those in the main phase mainly composed of the main component. In the present invention, said secondary phase may include other additives other than the respective oxides of Al, Si and R.

According to the present invention, preferably, a ceramic electronic device comprises a dielectric layer, wherein:

the dielectric layer includes a main component expressed by a composition formula of $Ba_mTiO_{2+m}$, wherein "m" satisfies $0.995 \leq m \leq 1.010$ and a ratio of Ba and Ti satisfies $0.995 \leq Ba/Ti \leq 1.010$, and a subcomponent;

the subcomponent includes an oxide of Al, an oxide of Si and an oxide of R (note that R is at least one kind selected from Sc, Y, La, Ce, Pr, Nd, Pm, Sm, Eu, Gd, Tb, Dy, Ho, Er, Tm, Yb and Lu); and at least a part of the oxide of Al, the oxide of Si and the oxide of R form a secondary phase being different from a main phase mainly composed of the main component, and the secondary phase is included in the dielectric layer.

In the present invention, it is preferable that the secondary phase formed in the dielectric layer includes the oxide of Al, the oxide of Si and the oxide of R. By forming the secondary layer by a composite oxide including respective oxides of Al, Si and R, the temperature characteristic of the capacitance and the IR temperature dependency can be improved comparing with those in the case of forming the secondary phase mainly and only by the oxide of Si and the oxide of R.

In the present invention, preferably, a content of the oxide of Al is 0 to 4.0 moles (note that 0 is not included), and more preferably 0.5 to 2.5 moles in terms of $Al_2O_3$ with respect to 100 moles of the main component. When the content of the Al oxide is too much, the average lifetime tends to deteriorate, while when the Al oxide is not added, sinterability of the dielectric layer declines and sintering becomes difficult. In the present invention, at least a part of the Al oxide is included in the secondary phase.

According to the present invention, preferably, a content of the oxide of Si is 0.5 to 10 moles, more preferably 2 to 10 moles, furthermore preferably 2 to 5.5 moles, and particularly preferably 2.5 to 5.5 moles in terms of $SiO_2$ with respect to 100 moles of the main component. When the content of the Si oxide is too small, the sinterability tends to deteriorate, while when too much, the high temperature load lifetime becomes insufficient and, moreover, the permittivity sharply declines. Preferably, at least a part of the Si oxide is included in the secondary phase.

According to the present invention, preferably, a content of the oxide of R is 0.2 to 7 moles, more preferably 1 to 7 moles, furthermore preferably 1 to 6 moles, and particularly preferably 2 to 6 moles in terms of $R_2O_3$ with respect to 100 moles of the main component. The oxide of R gives an effect of shifting the Curie's temperature to the high temperature side. When a content of the oxide of R is too small, the effect becomes insufficient, while when too much, the sinterability tends to decline. Preferably, at least a part of the oxide of R is included in the secondary phase.

Note that when forming the secondary phase by the oxides of Al and R, the content of the Si oxide may be zero. Alternately, when forming the secondary phase by the oxides of Al and Si, the oxide of R may be zero.

According to the present invention, preferably, the dielectric layer furthermore includes a subcomponent including at least one kind selected from MgO, CaO, BaO and SrO in an amount of 0 to 3.0 moles (note that 0 is not included) with respect to 100 moles of the main component, and a subcomponent including at least one kind selected from $V_2O_5$, $MoO_3$ and $WO_3$ in an amount of 0.01 to 0.5 mole with respect to 100 moles of the main component.

According to the present invention, preferably, the dielectric layer furthermore includes a subcomponent including $CaZrO_3$ or $CaO+ZrO_2$ in an amount of 5 moles or smaller (note that 0 is not included) with respect to 100 moles of the main component.

According to the present invention, there is provided a production method of a ceramic electronic device as set forth in any one of the above, comprising the steps of:

obtaining a preliminarily fired powder by performing preliminary firing without a compound of Al, a compound of Si and/or a compound of R (note that R is at least one kind selected from Sc, Y, La, Ce, Pr, Nd, Pm, Sm, Eu, Gd, Tb, Dy, Ho, Er, Tm, Yb and Lu);

obtaining a pre-fired powder by adding the compound of Al, the compound of Si and/or the compound of R to the preliminarily fired powder; and firing the pre-fired powder.

By preliminarily firing the main component and, if necessary, other additive subcomponent without a compound of Al, a compound of Si and/or a compound of R, then, adding the compound of Al, compound of Si and/or compound of R and firing, it is possible to form a secondary phase including the Al oxide, Si oxide and/or an oxide of R effectively.

Alternately, according to the present invention, there is provided a production method of the ceramic electronic device as set forth in any one of the above, comprising the steps of:

obtaining a primary paste without a compound of Al, a compound of Si and/or a compound of R (note that R is at least one kind selected from Sc, Y, La, Ce, Pr, Nd, Pm, Sm, Eu, Gd, Th, Dy, Ho, Er, Tm, Yb and Lu); and obtaining a secondary paste by adding the compound of Al, the compound of Si and/or the compound of R to the primary paste.

By obtaining a primary paste by mixing the main component and, if necessary, other additive subcomponent without an Al compound, a Si compound and/or a compound of R, adding the Al compound, Si compound and/or compound of R to the primary paste to obtain a secondary paste, forming a green chip by using the secondary paste and firing the green chip; it is possible to form a secondary phase including the Al oxide, Si oxide and/or the oxide of R effectively.

Note that, in the present invention, the Al compound, the Si compound and the compound of R respectively mean an Al oxide, a Si oxide and an oxide of R or compounds to be these oxides by firing.

According to the present invention, it is possible to provide a highly reliable ceramic electronic device having an excellent temperature characteristic of the capacitance and low IR temperature dependency, and the production method. Particularly, according to the present invention, it is possible to provide a ceramic electronic device capable of maintaining a high capacitance and high IR (insulation resistance) even at a high temperature (for example, 150° C.), and the production method.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Multilayer Ceramic Capacitor 1

Figure 1:
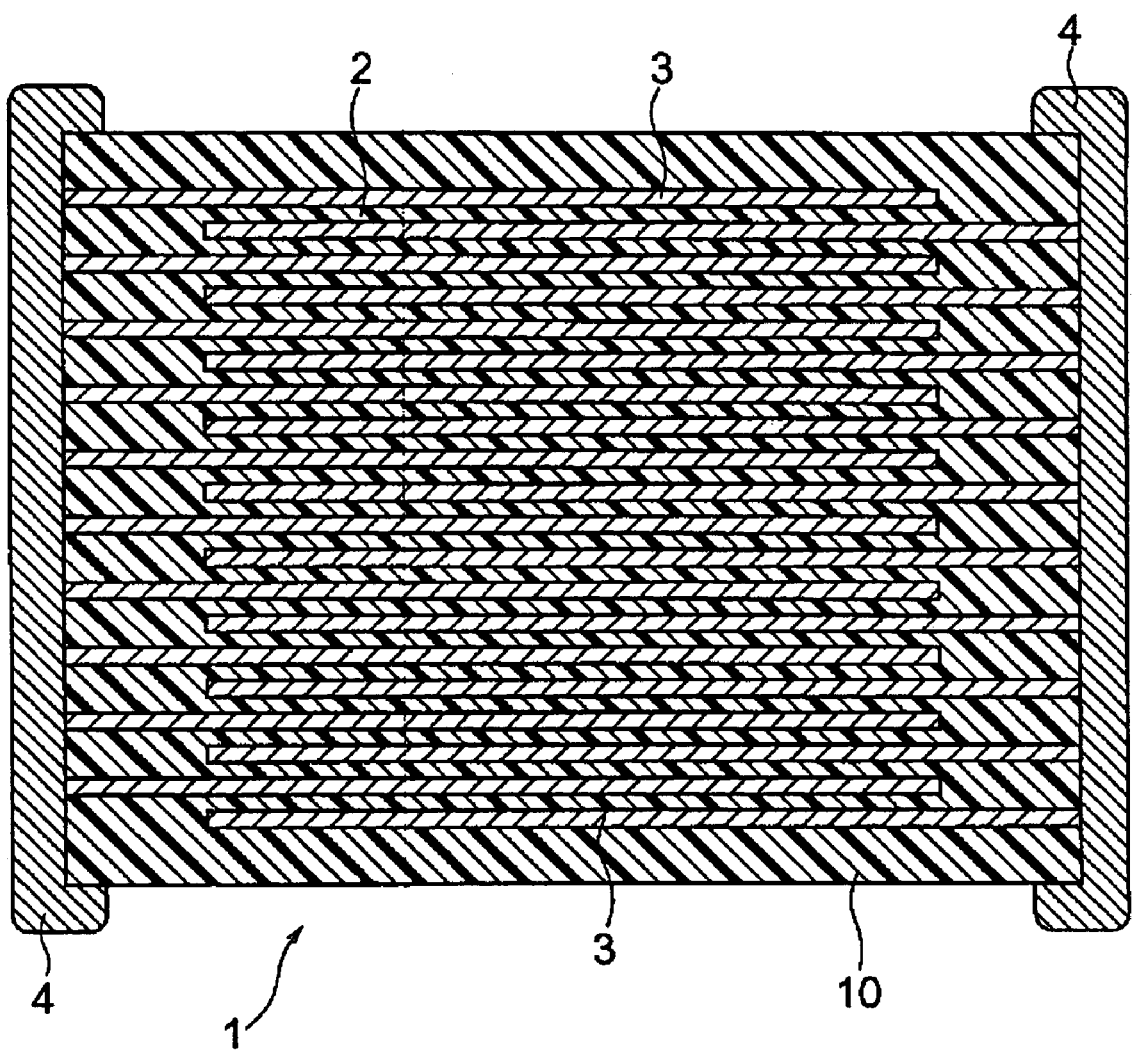
FIG. 1 is a sectional view of a multilayer ceramic capacitor according to an embodiment of the present invention.
Figure 2:
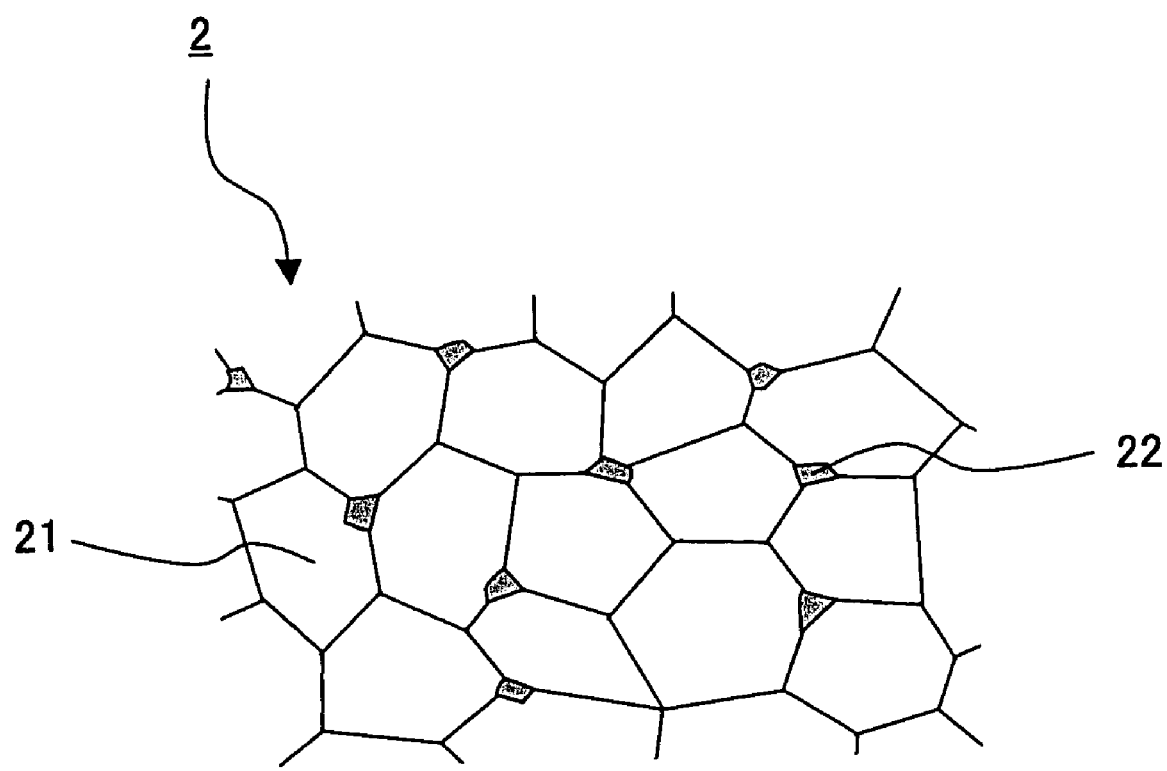
FIG. 2 is a view of the configuration of a dielectric layer according to an embodiment of the present invention.

As shown in FIG. 1, a multilayer ceramic capacitor 1 according to an embodiment of the present invention comprises a capacitor element body 10 configured that dielectric layers 2 and internal electrode layers 3 are alternately stacked. Both end portions of the capacitor element body 10 are formed a pair of external electrodes 4 respectively conducting to the internal electrode layers 3 arranged alternately in the element body 10. A shape of the capacitor element body 10 is not particularly limited, but is normally a rectangular parallelepiped shape. Also, a size thereof is not particularly limited and may be determined to a suitable size in accordance with the use object.

The internal electrode layers 3 are stacked, so that the respective end surfaces are exposed alternately to surfaces of two facing end portions of the capacitor element body 10. The pair of external electrodes 4 are formed at the both end portions of the capacitor element body 10 and connected to the exposed end surfaces of the alternately arranged internal electrode layers 3, so that a capacitor circuit is composed.

Dielectric Layer 2

The dielectric layer 2 includes a dielectric ceramic composition.

In the present embodiment, the dielectric ceramic composition includes a main component expressed by a composition formula of $Ba_mTiO_{2+m}$, wherein "m" is $0.995 \leq m \leq 1.010$ and a ratio of Ba and Ti is $0.995 \leq Ba/Ti \leq 1.010$.

Also, the dielectric ceramic composition includes as subcomponents, an oxide of Al, an oxide of Si and/or an oxide of R (note that R is at least one kind selected from Sc, Y, La, Ce, Pr, Nd, Pm, Sm, Eu, Gd, Tb, Dy, Ho, Er, Tm, Yb and Lu). Namely, the dielectric ceramic composition of the present embodiment includes the oxides of Al, Si and R in any one of the combinations below.

(1) Al oxide and Si oxide
(2) Al oxide and R oxide
(3) Al oxide, Si oxide and R oxide A content of the Al oxide is preferably 0 to 4.0 moles (note that 0 is not included), more preferably 0.5 to 2.5 moles in terms of $Al_2O_3$ with respect to 100 moles of the main component. The Al oxide gives an effect of enhancing sinterability of the dielectric layer 2. When a content of the Al oxide is too much, the average lifetime tends to decline, while when the Al oxide is not added, sinterability of the dielectric layer declines and sintering becomes difficult. Note that, in the present embodiment, at least a part of the Al oxide together with the Si oxide and/or oxide of R forms a secondary phase, which will be explained later on.

A content of the Si oxide is preferably 0.5 to 10 moles, more preferably 2 to 10 moles, furthermore preferably 2 to 5.5 moles, and particularly preferably 2.5 to 5.5 moles in terms of $SiO_2$ with respect to 100 moles of the main component. The Si oxide gives an effect of enhancing sinterability of the dielectric layer 2. When the content of the Si oxide is too small, the sinterability tends to decline, while when too much, the high temperature load lifetime becomes insufficient and the permittivity sharply declines. Note that, in the present embodiment, at least a part of the Si oxide preferably forms a secondary phase together with at least a part of the Al oxide (furthermore, together with at least a part of the oxide of R in accordance with need), which will be explained later on.

A content of the oxide of R is preferably 0.2 to 7 moles, more preferably 1 to 7 moles, furthermore preferably 1 to 6 moles and particularly preferably 2 to 6 moles in terms of $R_2O_3$ with respect to 100 moles of the main component. The oxide of R gives an effect of shifting the Curie's temperature to the high temperature side. When a content of the oxide of R is too small, the effect become insufficient, while when too much, the sinterability tends to decline. Note that, in the present embodiment, at least a part of the oxide of R preferably forms a secondary phase together with at least a part of the Al oxide (furthermore, together with at least a part of the Si oxide in accordance with need), which will be explained later on.

The oxide of R is an oxide of at least one kind selected from Sc, Y, La, Ce, Pr, Nd, Pm, Sm, Eu, Gd, Tb, Dy, Ho, Er, Tm, Yb and Lu. In the present embodiment, an oxide of at least one kind selected from Sc, Y, Tb, Dy, Ho, Er, Tm, Yb and Lu is preferable, and an oxide of at least one kind selected from Sc, Y, Dy, Ho, Yb and Lu is particularly preferable.

Preferably, the dielectric layer 2 furthermore includes
a subcomponent including at least one kind selected from MgO, CaO, BaO and SrO,
a subcomponent including at least one kind selected from $V_2O_5$, $MoO_3$ and $WO_3$, and
a subcomponent including $CaZrO_3$ or $CaO+ZrO_2$.

A content of the subcomponent including at least one kind selected from MgO, CaO, BaO and SrO is 0 to 3.0 moles (note that 0 is not included), and preferably 0.5 to 2.5 moles with respect to 100 moles of the main component. When the content is too small, a capacity-temperature change rate is liable to be high, while when too much, it is liable that the sinterability declines and high temperature load lifetime also declines. Note that component ratios of the oxides may be any.

A content of the subcomponent including at least one kind selected from $V_2O_5$, $MoO_3$ and $WO_3$ is 0.01 to 0.5 mole and preferably 0.1 to 0.4 mole with respect to 100 moles of the main component. The subcomponents exhibit an effect of flattening the capacity-temperature characteristic at the Curie's temperature or higher and an effect of improving the high temperature load lifetime. When the content is too small, the effect becomes insufficient, while when too much, the IR declines remarkably. Note that the component ratios of the oxides may be any.

A content of the subcomponent including $CaZrO_3$ or $CaO+ZrO_2$ is 5 moles or smaller (note that 0 is not included), and preferably 3 moles or smaller (note that 0 is not included) with respect to 100 moles of the main component. The subcomponent including $CaZrO_3$ or $CaO+ZrO_2$ gives effects of flattening capacity-temperature characteristics, improving insulation resistance (IR), improving a breakdown voltage and lowering a firing temperature, etc. in addition to an effect of shifting the Curie's temperature to the high temperature side.

Figure 3:
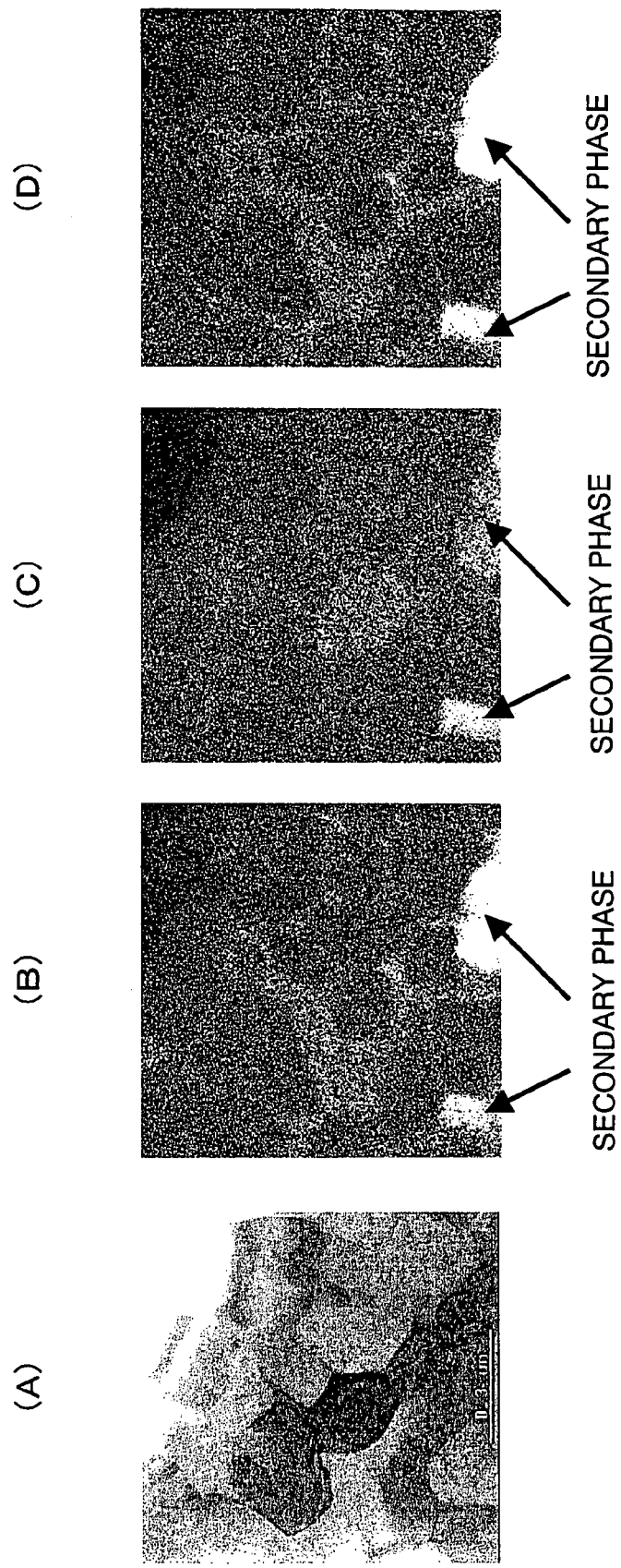
FIG. 3A is a TEM picture of the dielectric layer according to an example of the present invention.
FIG. 3B to FIG. 3D are TEM pictures of a fine structure of the dielectric layer according to an example of the present invention.

In the present embodiment, as shown in FIG. 3, a secondary phase (segregation phase) 22 is formed separately from a main phase (dielectric particles) 21 in the dielectric layer 2. The secondary phase 22 includes an oxide of Al, an oxide of Si and/or an oxide of R as composite oxides and is a part where these oxides exist in high concentration comparing with those in the main phase 21 mainly composed of the main component.

The secondary phase 22 includes the oxides of Al, Si and R in any one of the combinations below.

(1) Al oxide and Si oxide
(2) Al oxide and R oxide
(3) Al oxide, Si oxide and R oxide In the present embodiment, since the secondary phase 22 including the Al oxide, Si oxide and/or an oxide of R as composite oxides is formed, a temperature characteristic of the capacitance can be improved and the IR temperature dependency can be lowered. Particularly, in the present embodiment, declines of the capacitance and IR (insulation resistance) can be effectively prevented even at a high temperature of, for example, 150° C.

Based on the knowledge of the present inventors, it is necessary that the secondary phase includes the Al oxide, Si oxide and/or oxide of R to obtain the effects of the present invention. Namely, it is not possible for the secondary phase 22 to give the effects of the present invention in a state that the Si oxide and the oxide of R are included (the Al oxide is not included) and in a state that the Al oxide is included (the Si oxide and the oxide of R is not included).

A size of the secondary phase 22 in the dielectric layer 2 is not particularly limited, but is normally 1/100 to 1/10 or so of the dielectric layer 2. Alternately, a ratio of the secondary phase 22 in the dielectric layer 2 is 0 to 20 volume % or so (note that 0 is not included) with respect to the entire dielectric layer 2. When the secondary layer 22 is too large with respect to the dielectric layer 2, it is liable that the short-circuiting defective rate increases and permittivity declines.

A thickness of one dielectric layer 2 is not particularly limited, but is preferably 4.5 μm or thinner, more preferably 3.5 μm or thinner, and furthermore preferably 3.0 μm or thinner. The lower limit of the thickness is not particularly limited and is, for example, 0.5 μm or so.

The number of dielectric layers 2 to be stacked is not particularly limited and is preferably 20 or larger, more preferably 50 or larger, and particularly preferably 100 or larger. The upper limit of the number of stacked layers is not particularly limited and is, for example, 2000 or so.

Internal Electrode Layer 3

A conductive material included in the internal electrode layer 3 is not particularly limited, however, since the material composing the dielectric layer 2 is reduction-resistant, relatively inexpensive base metals can be used. As a base metal to be used as the conductive material, Ni or a Ni alloy is preferable. As a Ni alloy, an alloy of Ni with at least one kind of element selected from Mn, Cr, Co and Al is preferable, and a content of Ni in the alloy is preferably 95 wt % or more. Note that the Ni or Ni alloy may contain various trace components, such as P, in an amount of not more than 0.1 wt % or so. A thickness of an internal electrode layer 3 may be suitably determined in accordance with the use object, etc., but normally 0.1 to 3 μm is preferable, and 0.2 to 2.0 μm or so is particularly preferable.

External Electrode 4

A conductive material included in the external electrode 4 is not particularly limited, and inexpensive Ni, Cu and alloys of these may be used in the present invention. A thickness of an external electrode 4 may be suitably determined in accordance with the use object, etc., but normally 10 to 50 μm or so is preferable.

Production Method of Multilayer Ceramic Capacitor

A multilayer ceramic capacitor according to the present embodiment is produced by forming a green chip by a normal printing method or sheet method using a paste, firing the same, then, printing or transferring external electrodes and firing in the same way as that in a multilayer ceramic capacitor of the related art. Below, the production method will be explained specifically.

First, pre-fired powder (dielectric ceramic composition powder) included in the dielectric layer paste is prepared. Powder of $Ba_mTiO_{2+n}$ in the pre-fired powder may be normally what obtained by the so-called liquid-phase method, such as an oxalate method and a hydrothermal synthesis method, other than what obtained by the so-called solid-phase method of mixing the material, preliminarily firing and pulverizing.

In the present invention, preliminary firing is performed before obtaining the pre-fired powder having the composition explained above. First, the main component ($Ba_mTiO_{2+n}$) and other subcomponents explained above (for example, MgO, CaO, $V_2O_5$ and $CaZrO_3$ or compounds, etc., which become MgO, CaO, $V_2O_5$ and $CaZrO_3$ after firing) are mixed by a ball mill, etc. without a compound of Al, compound of Si and/or compound of R for forming the secondary phase 22 and dried to prepare a pre-preliminarily fired powder.

As the compounds to be the oxides (MgO, CaO, $V_2O_5$ and $CaZrO_3$, etc.) by a thermal treatment, for example, carbonates, oxalates, nitrates, hydroxides and organic metal compounds, etc. may be mentioned. The Al compound, Si compound and compound of R mean oxides of Al, Si and R ($Al_2O_3$, $SiO_2$ and $R_2O_3$) and compounds, which become oxides of Al, Si and R by a thermal treatment.

Next, the thus obtained pre-preliminarily fired powder is subject to preliminary firing to obtain a preliminarily-fired powder. The preliminary firing condition is not particularly limited, but the temperature rising rate is preferably 50 to 400° C./hour, and more preferably 100 to 300° C./hour, and the holding temperature is preferably 700 to 1100° C., and more preferably 700 to 900° C. Also, the temperature holding time (preliminary firing time) is set to be relatively short as preferably 0.5 to 6 hours, and more preferably 1 to 3 hours. Note that the preliminary firing atmosphere is in the air or in nitrogen.

Note that in the case of making the Si compound and the compound of R included in the dielectric layer 2 but not in the secondary phase 22, preliminary firing for a long time may be performed together with the main component and other subcomponents. Alternately, as far as the effects of the present invention are obtained, a part of finally adding quantities of the Al compound, Si compound and compound of R may be added before the preliminary firing.

Next, the preliminarily fired powder is roughly pulverized by an alumina roll, etc. and, then, the Al compound, Si compound and/or compound of R for forming the secondary phase 22 are added to obtain mixed powder. After that, if necessary, the mixed powder is mixed by a ball mill, etc. and dried, so that a pre-fired powder is obtained. Note that when adding the Al compound, Si compound and/or compound of R to the preliminarily fired powder, the compounds may be mixed and preliminarily fired to be added as a composite oxide.

In the present embodiment, the Al compound, Si compound and/or compound of R for forming the secondary phase 22 are excluded when performing preliminary firing to obtain a preliminarily fired powder. Then, the preliminarily fired powder is added with the Al compound, Si compound and/or compound of R to obtain a pre-fired powder. The pre-fired powder is made to be slurry to obtain a dielectric layer paste, and a green chip is produced by using the dielectric layer paste and fired. Therefore, in the present embodiment, it is possible to form the secondary phase 22 including the Al oxide, Si oxide and/or oxide of R effectively.

Next, the obtained pre-fired powder is made to be slurry to fabricate a dielectric layer paste. The dielectric layer paste may be an organic slurry obtained by kneading the pre-fired powder and an organic vehicle or a water based slurry.

In a state before being made to be slurry, a particle diameter of the pre-fired powder is normally 0.1 to 3 μm, and preferably 0.1 to 0.7 μm or so in an average particle diameter.

The organic vehicle is obtained by dissolving a binder in an organic solvent. A binder to be used for the organic vehicle is not particularly limited and may be suitably selected from a variety of normal binders, such as ethyl cellulose, polyvinyl butyral. Also, the organic solvent to be used is not particularly limited and may be suitably selected from a variety of organic solvents, such as terpineol, butyl carbitol, acetone and toluene, in accordance with the use method, such as the printing method and sheet method.

When making the dielectric layer paste water based slurry, a water-based vehicle obtained by dissolving a water-soluble binder and dispersant, etc. in water may be kneaded with the dielectric material. The water-soluble binder to be used for the water-based vehicle is not particularly limited and may be, for example, polyvinyl alcohol, cellulose and water-soluble acrylic resin, etc.

The internal electrode layer paste is fabricated by kneading the conductive material composed of the above variety of conductive metals and alloys, or a variety of oxides, organic metal compounds and resonates, etc. to be the above conductive materials after firing with the above organic vehicle.

An external electrode paste may be fabricated also in the same way as that of the internal electrode layer paste.

A content of the organic vehicle in each of the pastes explained above is not particularly limited and may be a normal content, for example, 1 to 5 wt % or so of the binder and 10 to 50 wt % or so of the solvent. Also, additives selected from a variety of dispersants, plasticizers, dielectrics and insulators, etc. may be included in each paste in accordance with need. Their total amount is preferably 10 wt % or smaller.

When using the printing method, the dielectric layer paste and the internal electrode layer paste are stacked and printed on PET or other substrate, the result is cut to be a predetermined shape and removed from the substrate, so that a green chip is obtained.

Alternately, when using the sheet method, a green sheet is formed by using the dielectric layer paste, the internal electrode layer paste is printed thereon, then, the results are stacked to obtain a green chip.

Binder removal processing is performed on the green chip before firing. The binder removal processing may be suitably determined in accordance with a kind of a conductive material in the internal electrode layer paste. When Ni, a Ni alloy or other base metal is used as the conductive material, the oxygen partial pressure in the binder removal atmosphere is preferably $10^{-45}$ to $10^5$ Pa. When the oxygen partial pressure is lower than the above range, the binder removal effect declines, while when the oxygen partial pressure is higher than the above range, the internal electrode layer tends to be oxidized.

Other binder removal processing is a temperature rising rate of preferably 5 to 300° C./hour, and more preferably 10 to 100° C./hour, a holding temperature of preferably 180 to 400° C., and more preferably 200 to 350° C., and the temperature holding time of preferably 0.5 to 24 hours, and more preferably 2 to 20 hours. The binder removal atmosphere is preferably in the air or a reducing atmosphere.

Also, it is preferable to use a wet mixed gas of $N_2$ and $H_2$ as an atmosphere gas in a reducing atmosphere.

Next, the green chip is fired. An atmosphere at firing the green chip may be suitably determined in accordance with a kind of the conductive material in the internal electrode layer paste, but when using Ni, a Ni alloy or other base metal as the conductive material, an oxygen partial pressure in the firing atmosphere is preferably $10^{-7}$ to $10^{-3}$ Pa. When the oxygen partial pressure is lower than the range, the conductive material in the internal electrode layer results in abnormal sintering and breaks in some cases. While when it exceeds the range, the internal electrode layer tends to oxidize.

Also, a holding temperature at the firing is preferably 1100 to 1400° C., and more preferably 1200 to 1360° C. When the holding temperature is lower than the range, densification becomes insufficient, while when higher than the range, breakings of electrodes due to abnormal sintering of the internal electrode layer, deterioration of capacity-temperature characteristics due to dispersion of the internal electrode layer component, and reduction of the dielectric ceramic composition are easily caused.

As other firing condition, the temperature rising rate is preferably 50 to 500° C./hour and more preferably 200 to 360° C./hour, the temperature holding time is preferably 0.5 to 8 hours and more preferably 1 to 3 hours, and the cooling rate is preferably 50 to 500° C./hour and more preferably 200 to 300° C./hour. The firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen-partial pressure in the annealing atmosphere is preferably 0.1 to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layers becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR lifetime are easily caused. Note that the annealing may be composed only of a temperature rising step and a temperature lowering step. Namely, the temperature holding time may be zero. In that case, the holding temperature is a synonym of the highest temperature.

As other annealing condition, the temperature holding time is preferably 0 to 20 hours and more preferably 2 to 10 hours, and the cooling rate is preferably 50 to 500° C./hour and more preferably 100 to 300° C./hour. A preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, a preferable water temperature is 5 to 75° C. or so.

The binder removal processing, firing and annealing may be performed continuously or separately.

End surface polishing, for example, by barrel polishing or sand blasting, etc. is performed on the capacitor element body obtained as above, and the external electrode paste is printed or transferred and fired to form external electrodes 4. A preferable firing condition of the external electrode paste is, for example, at 600 to 800° C. in a wet mixed gas of $N_2$ and $H_2$ for 10 minutes to 1 hour or so. A cover layer is formed by plating, etc. on the surface of the external electrodes 4, if necessary.

The multilayer ceramic capacitor of the present invention produced as above is mounted on a print substrate, etc. by soldering, etc. and used for a variety of electronic apparatuses, etc.

Embodiments of the present invention were explained above, but the present invention is not limited to the embodiments and may be variously modified within the scope of the present invention.

For example, in the above embodiments, a multilayer ceramic capacitor was explained as an example of an electronic device according to the present invention, but an electronic device according to the present invention is not limited to the multilayer ceramic capacitor and may be any as far as it is composed of a dielectric ceramic composition having the above composition.

Also, in the above embodiment, a procedure of producing a dielectric layer paste by performing preliminary firing without a compound of Al, a compound of Si and/or a compound of R for forming the secondary phase 22, then, adding the compound of Al, compound of Si and/or compound of R to the preliminarily fired powder to obtain a pre-fired powder, and making the pre-fired powder to be slurry was applied; but the procedure described below may be also applied.

First, the main component and other subcomponents (for example, MgO, CaO, $V_2O_5$ and $CaZrO_3$ or compounds, etc., which become MgO, CaO, $V_2O_5$ and $CaZrO_3$ after firing) are mixed by a ball mill, etc. without the compound of Al, compound of Si and/or compound of R for forming the secondary phase 22 to obtain a primary paste. Next, the compound of Al, compound of Si and/or compound of R are added to the primary paste and mixed by a ball mill, etc. to obtain a secondary paste (dielectric layer paste). Note that when adding the compound of Al, compound of Si and/or compound of R to the primary paste, the compounds may be made to be a composite oxide by mixing and preliminary firing and added.

By applying the procedure, the main component and other subcomponents mixed in advance and the later added compound of Al, compound of Si and/or compound of R can be mixed inhomogenously. Consequently, by producing a green chip by using the secondary paste (dielectric layer paste) and firing the same, the secondary phase 22 including the compound of Al, compound of Si and/or compound of R can be formed effectively.

EXAMPLES

Below, the present invention will be explained based-on further detailed examples, but the present invention is not limited to the examples.

Example 1

First, to produce a pre-preliminarily fired powder, the main component material ($BaTiO_3$) and subcomponent materials listed below having an average particle diameter of 0.3 μm are prepared and mixed.

MgO: 1.1 mole
$V_2O_5$: 0.06 mole
$MnCO_3$: 0.4 mole
$CaZrO_3$: 1.7 moles

An adding quantity of each of the subcomponents is the number of moles with respect to 100 moles of $BaTiO_3$ as the main component.

Then, the pre-preliminarily fired powder was preliminarily fired. The preliminary firing condition was as below.

Temperature rising rate: 200° C./hour
Holding temperature: 800° C.
Temperature holding time: 2 hours
Atmosphere: in the air A material obtained by the preliminary firing was pulverized by a pulverizer for 1 hour to obtain a preliminarily fired powder. Then, the preliminarily fired powder was added with 1.5 moles of $Al_2O_3$ as an oxide of Al, 3.0 moles of $SiO_2$ as an oxide of Si and 3.0 moles of $Tb_2O_3$ as an oxide of R with respect to 100 moles of $BaTiO_3$, subjected to wet mixing by a zirconia ball mill for 16 hours and dried to obtain a pre-fired powder.

Next, 4.8 parts by weight of an acrylic resin, 100 parts by weight of ethyl acetate, 6 parts by weight of mineral sprit and 4 parts by weight of toluene are mixed by a ball mill to be a paste, so that a dielectric layer paste was obtained.

Next, 44.6 parts by weight of Ni particles, 52 parts by weight of terpineol, 3 parts by weight of ethyl cellulose and 0.4 parts by weight of benzotriazole were kneaded by a triple roll to be slurry, so that an internal electrode layer paste was obtained.

By using the pastes, the multilayer ceramic chip capacitor 1 shown in FIG. 1 was produced as below.

First, a green sheet was formed on a PET film by using the dielectric layer paste. After printing the internal electrode layer paste thereon, the green sheet was removed from the PET film. Next, the green sheets and protective green sheets (not printed with the internal electrode layer paste) were stacked and bonded with pressure to obtain a green chip.

Next, the green chip was cut to be a predetermined size and subjected to binder removal processing, firing and annealing under conditions described below, so that a multilayer ceramic fired body was obtained.

The binder removal processing was performed under a condition of a temperature rising rate of 30° C./hour, the holding temperature of 260° C. and the holding time of 8 hours in the air.

Firing was performed under a condition of the temperature rising rate of 200° C./hour, the holding temperature of 1240° C., the holding time of 2 hours, the temperature cooling rate of 200° C./hour in an atmosphere of a wet mixed gas of $N_2+H_2$ (the oxygen partial pressure was $10^{-2}$ Pa).

Annealing was performed under a condition of the temperature rising rate of 200° C./hour, the holding temperature of 1000° C., the temperature holding time of 2 hours, the temperature cooling rate of 300° C./hour in a wet $N_2$ gas atmosphere (the oxygen partial pressure was $10^{-1}$ Pa).

Note that a wetter, wherein the water temperature was 5 to 75° C., was used to wet the atmosphere gas in the firing and annealing.

Next, after end surfaces of the obtained multilayer ceramic fired body was polished by sand blasting, In—Ga was applied as an external electrode, so that a sample of the multilayer ceramic capacitor shown in FIG. 1 was obtained.

A size of the obtained capacitor sample was 3.2 mm×1.6 mm×0.6 mm, the number of dielectric layers sandwiched by the internal electrode layers was 4 and a thickness of one dielectric layer (interlayer thickness) was 3.5 μm, and a thickness of the internal electrode layer was 1.0 μm.

Observation of the secondary phase, measurement of the temperature dependency of the capacitance and measurement of IR temperature dependency were made on- the obtained capacitor samples by the methods below, respectively.

Observation of Secondary Phase

First, the capacitor sample was cut at a vertical section with respect to the dielectric layers of the capacitor sample. Then, SEM observation and EPMA analysis were made on the cut section and an existence of a secondary phase was confirmed from results of element mapping of Al elements, Si elements and R elements (Tb elements in the present example).

Note that FIG. 3A to FIG. 3D are SEM pictures and EPMA pictures of a sample of a later explained example 3. Specifically, FIG. 3A is a SEM picture of the sample of example 3, FIG. 3B is a picture showing a result of element mapping of the Al elements, FIG. 3C is a picture showing a result of element mapping of the Si elements, and FIG. 3D is a picture showing a result of element mapping of the Y elements (R elements). Note that a white part in the figures is a segregation part of the Al elements, Si elements and Y elements (R elements).

Temperature Dependency of Capacitance

A capacitance of the capacitor samples at 20° C., 125° C. and 150° C. was measured and change rates AC (unit is %) of the capacitance at 125° C. and 150° C. with respect to that at 20° C. were calculated. The closer the change rate of the capacitance is to 0% (the absolute value is small), the more preferable. In the present example, those having the change rate of the capacitance at 150° C. of within ±15% were determined preferable. The results are shown in Table 1.

IR Temperature Dependency (Loss of Significant Digits)

First, on each capacitor sample, insulation resistance $IR_{25}$ at 25° C., insulation resistance $IR_{125}$ at 125° C. and insulation resistance $IR_{150}$ at 150° C. were measured, respectively. Measurement of insulation resistance (the unit is Ω) was made after applying a DC of 7V/μm for 60 seconds at 25° C., 125° C. and 150° C. by using an insulation-resistance tester (R8340A made by Advantest Corporation). Next, a loss of significant digits at 125° C. expressed by the formula (1) below was calculated from the insulation resistance values $IR_{125}$ and $IR_{25}$ and that at 150° C. expressed by the formula (2) below was calculated from the insulation resistance values $IR_{150}$ and $IR_{25}$, respectively. The smaller the value of the loss of significant digits is, the more preferable. In the present example, −2.00 or larger were considered preferable. The results are shown in Table 1.

$$\log(IR_{125}/IR_{25}) \quad (1)$$

$$\log(IR_{150}/IR_{25}) \quad (2)$$

Examples 2 to 9

Other than respectively using the rare earth elements shown in Table 1 instead of an oxide of Tb ($Tb_2O_3$) as an oxide of R, capacitor samples of examples 2 to 9 were produced in the same way as that in the example 1, and observation of a secondary phase and evaluation of temperature dependency of the capacitance and IR temperature dependency were made in the same way as those in the example 1. The results are shown in Table 1. Note that an adding quantity of the oxide of R in each example was the same as that in the example 1.

TABLE 1

| | Elements Forming Secondary Phase | | | Temperature Dependency of Capacity (%) | | IR Temperature Dependency | |
|---|---|---|---|---|---|---|---|
| | Aluminum | Silicon | Rare Earth Element | 125° C. | 150° C. | 125° C. | 150° C. |
| Example 1 | Al | Si | Tb | — | −5.1 | −13.7 | −0.89 | −1.9 |
| Example 2 | Al | Si | Dy | — | −3.2 | −11.5 | −0.96 | −1.97 |
| Example 3 | Al | Si | Y | — | −2.5 | −9.2 | −0.81 | −1.87 |
| Example 4 | Al | Si | Ho | — | −2.7 | −9.5 | −0.92 | −1.91 |
| Example 5 | Al | Si | Er | — | −2.1 | −8.1 | −0.78 | −1.81 |
| Example 6 | Al | Si | Tm | — | −2 | −7.4 | −0.86 | −1.87 |
| Example 7 | Al | Si | Yb | — | −1.7 | −5.6 | −0.81 | −1.82 |
| Example 8 | Al | Si | Lu | — | −1.5 | −5 | −0.89 | −1.89 |
| Example 9 | Al | Si | Sc | — | −1.2 | −4.8 | −0.92 | −1.91 |

Evaluation 1

Table 1 shows elements forming a secondary phase and measurement results of temperature dependency of the capacitance and IR temperature dependency of the capacitor samples of examples 1 to 9.

From Table 1, it was confirmed that by forming the secondary phase including an oxide of AL, an oxide of Si and an oxide of R (R is Tb, Dy, Y, Ho, Er, Tm, Yb, Lu and Sc in the present example), the capacity change rate (temperature dependency of a capacity) at 150° C. could be within ±15% and the IR temperature dependency (a loss of significant digits) at 150° C. could be −2.0 or larger. Also, as is clear from Table 1, in the case of using an oxide of a variety of rare earth as an oxide of R, the effects of the present invention can be obtained.

Example 10

Other than using an oxide of Dy ($Dy_2O_3$) and an oxide of Yb ($Yb_2O_3$) instead of the oxide of Tb ($Tb_2O_3$) as an oxide of R, capacitor samples of an examples 10 were produced in the same way as that in the example 1, and observation of a secondary phase and evaluation of temperature dependency of the capacitance and IR temperature dependency were made in the same way as those in the example 1. The results are shown in Table 2. Note that, in the example 10, adding quantities of $Dy_2O_3$ and $Yb_2O_3$ were 1.5 moles of $Dy_2O_3$ and 3.0 moles of $Yb_2O_3$ with respect to 100 moles of $BaTiO_3$.

Examples 11 to 23

Other than using respective rare earth elements shown in Table 2 instead of an oxide of Dy ($Dy_2O_3$) and an oxide of Yb ($Yb_2O_3$) as an oxide of R, capacitor samples of examples 11 to 23 were produced in the same way as that in the example 1, observation of a secondary phase and evaluation of temperature dependency of the capacitance and IR temperature dependency were made in the same way as those in the example 1. The results are shown in Table 2. Note that adding quantities of two kinds of oxides of R in the respective examples were the same as those in the example 10.

perature dependency of the capacitance and IR temperature dependency were made in the same way as those in the example 1. Namely, in the example 24, an oxide of Si was added before preliminary firing, the preliminary firing was performed in a state of being added with the Si oxide, and the Si oxide was not added after the preliminary firing. The results are shown in Table 3.

Example 25

Other than using $Yb_2O_3$ instead of $Y_2O_3$ as an oxide of R, capacitor samples were produced in the same way as that in the example 24, and observation of a secondary phase and evaluation of temperature dependency of the capacitance and IR temperature dependency were made in the same way as those in the example 1. The results are shown in Table 3.

TABLE 2

Table 2

| | Elements Forming Secondary Phase | | | Temperature Dependency of Capacity (%) | | IR Temperature Dependency | |
|---|---|---|---|---|---|---|---|
| | Aluminum | Silicon | Rare Earth Element | | 125° C. | 150° C. | 125° C. | 150° C. |
| Example 10 | Al | Si | Dy | Yb | −3.1 | −10.1 | −0.79 | −1.8 |
| Example 11 | Al | Si | Dy | Lu | −2.6 | −9.4 | −0.82 | −1.84 |
| Example 12 | Al | Si | Dy | Sc | −2 | −8.1 | −0.84 | −1.85 |
| Example 13 | Al | Si | Y | Ho | −2.4 | −9.3 | −0.76 | −1.78 |
| Example 14 | Al | Si | Y | Er | −3.1 | −9.1 | −0.75 | −1.77 |
| Example 15 | Al | Si | Y | Tm | −2.5 | −8.4 | −0.81 | −1.79 |
| Example 16 | Al | Si | Y | Yb | −1.9 | −7.1 | −0.79 | −1.8 |
| Example 17 | Al | Si | Y | Lu | −2.1 | −6.4 | −0.81 | −1.84 |
| Example 18 | Al | Si | Y | Sc | −2 | −5.9 | −0.77 | −1.82 |
| Example 19 | Al | Si | Ho | Er | −2.8 | −9.5 | −0.87 | −1.89 |
| Example 20 | Al | Si | Ho | Tb | −3.1 | −9.1 | −0.88 | −1.88 |
| Example 21 | Al | Si | Ho | Yb | −3 | −8.9 | −0.9 | −1.91 |
| Example 22 | Al | Si | Ho | Lu | −2 | −8.1 | −0.92 | −1.93 |
| Example 23 | Al | Si | Ho | Sc | −1.1 | −7.1 | −0.9 | −1.91 |

Evaluation 2

Table 2 shows elements forming a secondary phase and measurement results of temperature dependency of the capacitance and IR temperature dependency of the capacitor samples of the examples 10 to 23.

From Table 2, it was confirmed that even when using oxides of two kinds of rare earth elements as an oxide of R included in the secondary phase, the capacity change rate (temperature dependency of a capacity) at 150° C. could be within ±15% and the IR temperature dependency (a loss of significant digits) at 150° C. could be −2.0 or larger in the same way as in the examples 1 to 9. Also, as is clear from Table 2, in the case of combining oxides of a variety of rare earth for use as an oxide of R, the effects of the present invention can be also obtained.

Example 24

Other than adding an oxide of Al and an oxide of R ($Y_2O_3$) to the preliminarily fired powder and firing to obtain a pre-fired powder, capacitor samples of example 24 were produced in the same way as that in the example 1, and observation of a secondary phase and evaluation of tem- Example 26

Other than using $Y_2O_3$ and $Yb_2O_3$ instead of $Y_2O_3$ as an oxide of R, capacitor samples were produced in the same way as that in the example 24, and observation of a secondary phase and evaluation of temperature dependency of the capacitance and IR temperature dependency were made in the same way as those in the example 1. The results are shown in Table 3. Note that, in the example 26, adding quantities of $Y_2O_3$ and $Yb_2O_3$ were 4.0 moles of $Y_2O_3$ and 1.5 moles of $Yb_2O_3$ with respect to 100 moles of $BaTiO_3$.

Example 27

Other than obtaining a pre-fired powder by adding an oxide of Al and an oxide of Si to the preliminarily fired powder, capacitor samples of the example 27 were produced in the same way as that in the example 1, and observation of a secondary phase and evaluation of temperature dependency of the capacitance and IR temperature dependency were made in the same way as those in the example 1. Namely, in the example 27, $Y_2O_3$, an oxide of R was added before preliminary firing, the preliminary firing was performed in a state of being added with an oxide of R, and an oxide of R was not added after the preliminary firing. The results are shown in Table 3.

TABLE 3

Table 3

| | Elements Forming Secondary Phase | | | Temperature Dependency of Capacity (%) | | IR Temperature Dependency | |
|---|---|---|---|---|---|---|---|
| | Aluminum | Silicon | Rare Earth Element | | 125° C. | 150° C. | 125° C. | 150° C. |
| Example 24 | Al | — | Y | — | −2.1 | −9.1 | −0.75 | −1.78 |
| Example 25 | Al | — | Yb | — | −1.5 | −5 | −0.68 | −1.65 |
| Example 26 | Al | — | Y | Yb | −1.7 | −8.4 | −0.76 | −1.7 |
| Example 27 | Al | Si | — | — | −3.6 | −9.6 | −0.78 | −1.69 |

Evaluation 3

Table 3 shows elements forming a secondary phase and measurement results of temperature dependency of the capacitance and IR temperature dependency of the capacitor samples of the examples 24 to 27.

From Table 3, it was confirmed that even in the case of forming a secondary phase including an oxide of Si or an oxide of R, the capacity change rate (temperature dependency of a capacity) at 150° C. could be within ±15% and the IR temperature dependency (a loss of significant digits) at 150° C. could be −2.0 or larger in the same way as in the examples 1 to 9. Namely, in both of the cases of combining an oxide of Al and an oxide of R (examples 24 to 26) and combining an oxide of Al and an oxide of Si (example 27), it was confirmed that the effects of the present invention could be also obtained.

Comparative Example 1

Other than adding an oxide of Al ($Al_2O_3$), an oxide of Si ($SiO_2$) and an oxide of R ($Y_2O_3$) before preliminary firing, performing the preliminary firing for a long time and not adding any of the oxides of Al, Si and R, capacitor samples of a comparative example 1 were produced in the same way as that in the example 1, and observation of a secondary phase and evaluation of temperature dependency of the capacitance and IR temperature dependency were made in the same way as those in the example 1. The results are shown in Table 4.

Comparative Example 2

Other than obtaining a pre-fired powder by adding $Y_2O_3$, an oxide of R, to the preliminarily fired powder, capacitor samples of a comparative example 2 were produced in the same way as that in the example 1, and observation of a secondary phase and evaluation of temperature dependency of the capacitance and IR temperature dependency were made in the same way as those in the example 1. Namely, in the comparative example 2, an oxide of Al and an oxide of Si were added before preliminary firing, the preliminary firing was performed in a state of being added with the Al oxide and Si oxide, and the Al oxide and Si oxide were not added after the preliminary firing. The results are shown in Table 4.

Comparative Example 3

Other than obtaining a pre-fired powder by adding an oxide of Si and $Y_2O_3$, an oxide of R, to the preliminarily fired powder, capacitor samples of a comparative example 3 were produced in the same way as that in the example 1, and observation of a secondary phase and evaluation of temperature dependency of the capacitance and IR temperature dependency were made in the same way as those in the example 1. Namely, in the comparative example 3, an oxide of Al was added before preliminary firing, the preliminary firing was performed in a state of being added with the Al oxide, and the Al oxide was not added after the preliminary firing. The results are shown in Table 4.

Comparative-Example 4

Other than obtaining a pre-fired powder by adding an oxide of Al to the preliminarily fired powder, capacitor samples of a comparative example 4 were produced in the same way as that in the example 1, and observation of a secondary phase and evaluation of temperature dependency of the capacitance and IR temperature dependency were made in the same way as those in the example 1. Namely, in the comparative example 4, an oxide of Si and $Y_2O_3$, an oxide of R, were added before preliminary firing, the preliminary firing was performed in a state of being added with the oxide of Si and oxide of R, and the oxide of Si and oxide of R were not added after the preliminary firing. The results are shown in Table 4.

TABLE 4

Table 4

| | Elements Forming Secondary Phase | | | Temperature Dependency of Capacity (%) | | IR Temperature Dependency | |
|---|---|---|---|---|---|---|---|
| | Aluminum | Silicon | Rare Earth Element | | 125° C. | 150° C. | 125° C. | 150° C. |
| Comparative Example 1 | — | — | — | — | −12.3 | −20.1 | −0.8 | −1.81 |
| Comparative Example 2 | — | — | Y | — | −10.1 | −18.9 | −1.03 | −2.01 |

TABLE 4-continued

Table 4

|  | Elements Forming Secondary Phase | | | Temperature Dependency of Capacity (%) | | IR Temperature Dependency | |
|---|---|---|---|---|---|---|---|
|  | Aluminum | Silicon | Rare Earth | Element | 125° C. | 150° C. | 125° C. | 150° C. |
| Comparative Example 3 | — | Si | Y | — | −2.1 | −10.1 | −2.21 | −2.97 |
| Comparative Example 4 | Al | — | — | — | −7.8 | −16.7 | −1.21 | −2.34 |

Evaluation 4

Table 4 shows elements forming a secondary phase and measurement results of temperature dependency of the capacitance and IR temperature dependency of the capacitor samples of the comparative examples 1 to 4.

From Table 4, it was confirmed that in the comparative example 1, wherein an oxide of Al, an oxide of Si and an oxide of R were added before preliminary firing, a secondary phase was not formed, the temperature dependency of the capacitance became −20.1%, which was poor.

Also, in the comparative example 2, wherein an oxide of R was added alone after preliminary firing, and in the comparative example 3, wherein an oxide of Si and an oxide of R were added after preliminary firing, a secondary phase including an oxide of R (comparative example 2) and that including an oxide of R and an oxide of Si (comparative example 3) were formed, respectively; however, the results showed that the IR temperature dependency were poor in both cases.

Furthermore, in the comparative example 4, wherein an oxide of Al was added alone after preliminary firing, a secondary phase including an oxide of Al was formed, but the result showed that the IR temperature dependency was poor.

The followings were confirmed from the comparative examples 1 to 4.

From the comparative example 1, it is known that when a secondary phase is not formed, the temperature dependency of a capacitance deteriorates.

From the comparative examples 2 and 3, it is known that even when a secondary phase is formed, if an oxide of Al is not included therein, the IR temperature dependency deteriorates.

From the comparative example 4, it is known that even when a secondary phase including an oxide of Al is formed, if an oxide of Si or an oxide of R is not included in the secondary phase, the IR temperature dependency deteriorates.

Namely, it was confirmed that a secondary phase including an oxide of Al, an oxide of Si and/or an oxide of R had to be formed to obtain the effects of the present invention.

What is claimed is:

1. A ceramic electronic device comprising a dielectric layer, wherein:
   said dielectric layer includes a main component expressed by a composition formula of $Ba_mTiO_{2+m}$, wherein "m" is $0.995 \leq m \leq 1.010$ and a ratio of Ba and Ti is $0.995 \leq Ba/Ti \leq 1.010$, and a subcomponent;
   said subcomponent includes
      an oxide of Al, and
      an oxide of Si or an oxide of oxide of R, where R is at least one selected from Sc, Y, La, Ce, Pr, Nd, Pm, Sm, Eu, Gd, Tb, Dy, Ho, Er, Tm, Yb and Lu; and
   at least a part of said oxide of Al and at least a part of said oxide of Si or said oxide of R form a secondary phase being different from a main phase mainly composed of said main component, and said secondary phase is included in said dielectric layer.

2. A ceramic electronic device comprising a dielectric layer, wherein:
   said dielectric layer includes a main component expressed by a composition formula of $Ba_mTiO_{2+m}$, wherein "m" satisfies $0.995 \leq m \leq 1.010$ and a ratio of Ba and Ti satisfies $0.995 \leq Ba/Ti \leq 1.010$, and a subcomponent;
   said subcomponent includes
      an oxide of Al, an oxide of Si and an oxide of oxide of R, where R is at least one kind selected from Sc, Y, La, Ce, Pr, Nd, Pm, Sm, Eu, Gd, Tb, Dy, Ho, Er, Tm, Yb and Lu; and
   at least a part of said oxide of Al, said oxide of Si and said oxide of R form a secondary phase being different from a main phase mainly composed of said main component, and said secondary phase is included in said dielectric layer.

3. The ceramic electronic device as set forth in claim 1, wherein a content of said oxide of Al is 0 to 4.0 moles, excluding 0, in terms of $Al_2O_3$ with respect to 100 moles of said main component.

4. The ceramic electronic device as set forth in claim 1, wherein a content of said oxide of Si is 0.5 to 10 moles in terms of $SiO_2$ with respect to 100 moles of said main component.

5. The ceramic electronic device as set forth in claim 1, wherein a content of said oxide of R is 0.2 to 7 moles in terms of $R_2O_3$ with respect to 100 moles of said main component.

6. The ceramic electronic device as set forth in claim 1, wherein:
   said dielectric layer furthermore includes
      a subcomponent including at least one kind selected from MgO, CaO, BaO and SrO in a amount of 0 to 3.0 moles, excluding 0, with respect to 100 moles of said main component, and
      a subcomponent including at least one kind selected from $V_2O_5$, $MoO_3$ and $WO_3$ in a amount of 0.01 to 0.5 mole with respect to 100 moles of said main component.

7. The ceramic electronic device as set forth in claim 6, wherein said dielectric layer furthermore includes a subcomponent including $CaZrO_3$ or $CaO+ZrO_2$ in an amount of 5 moles or smaller, excluding 0, with respect to 100 moles of said main component.

8. A production method of a ceramic electronic device as set forth in claim 1, comprising the steps of:
  obtaining a preliminarily fired powder by performing preliminary firing without a compound of Al, a compound of Si and/or a compound of R, where R is at least one kind selected from Sc, Y, La, Ce, Pr, Nd, Pm, Sm, Eu, Gd, Tb, Dy, Ho, Er, Tm, Yb and Lu;
  obtaining a pre-fired powder by adding said compound of Al, said compound of Si and/or said compound of R to said preliminarily fired powder; and
  firing said pre-fired powder.

9. The production method of a ceramic electronic device as set forth in claim 1, comprising the steps of:
  obtaining a primary paste without a compound of Al, a compound of Si and/or a compound of R, where R is at least one kind selected from Sc, Y, La, Ce, Pr, Nd, Pm, Sm, Eu, Gd, Tb, Dy, Ho, Er, Tm, Yb and Lu; and
  obtaining a secondary paste by adding said compound of Al, said compound of Si and/or said compound of R to said primary paste.

10. The ceramic electronic device as set forth in claim 2, wherein a content of said oxide of Al is 0 to 4.0 moles, excluding 0, in terms of $Al^2O_3$ with respect to 100 moles of said main component.

11. The ceramic electronic device as set forth in claim 2, wherein a content of said oxide of Si is 0.5 to 10 moles in terms of $SiO_2$ with respect to 100 moles of said main component.

12. The ceramic electronic device as set forth in claim 2, wherein a content of said oxide of R is 0.2 to 7 moles in terms of $R_2O_3$ with respect to 100 moles of said main component.

13. The ceramic electronic device as set forth in claim 2, wherein:
  said dielectric layer furthermore includes
    a subcomponent including at least one kind selected from MgO, CaO, BaO and SrO in a amount of 0 to 3.0 moles, excluding 0, with respect to 100 moles of said main component, and
    a subcomponent including at least one kind selected from $V_2O_5$, $MoO_3$ and $WO_3$ in a amount of 0.01 to 0.5 mole with respect to 100 moles of said main component.

14. A production method of a ceramic electronic device as set forth in claim 2, comprising the steps of:
  obtaining a preliminarily fired powder by performing preliminary firing without a compound of Al, a compound of Si and/or a compound of R, where is at least one kind selected from Sc, Y, La, Ce, Pr, Nd, Pm, Sm, Eu, Gd, Tb, Dy, Ho, Er, Tm, Yb and Lu;
  obtaining a pre-fired powder by adding said compound of Al, said compound of Si and/or said compound of R to said preliminarily fired powder; and
  firing said pre-fired powder.

15. The production method of a ceramic electronic device as set forth in claim 2, comprising the steps of:
  obtaining a primary paste without a compound of Al, a compound of Si and/or a compound of R, where R is at least one kind selected from Sc, Y, La, Ce, Pr, Nd, Pm, Sm, Eu, Gd, Tb, Dy, Ho, Er, Tm, Yb and Lu; and
  obtaining a secondary paste by adding said compound of Al, said compound of Si and/or said compound of R to said primary paste.

\* \* \* \* \*